United States Patent [19]

Ishikawa et al.

[11] Patent Number: 5,416,511
[45] Date of Patent: May 16, 1995

[54] OBSERVATION APPARATUS FOR SELECTIVELY PROVIDING COLOR SIGNALS

[75] Inventors: Seiji Ishikawa, Chigasaki; Masanori Hirai, Tokyo; Hajime Murakami, Chigasaki; Masao Yamamoto, Tama, all of Japan

[73] Assignees: Mitsubishi Chemical Corporation, Tokyo; Scalar Co., Tama, both of Japan

[21] Appl. No.: 66,415

[22] Filed: May 25, 1993

[30] Foreign Application Priority Data

May 29, 1992 [JP] Japan .................................. 4-161725

[51] Int. Cl.$^6$ .............................................. H04N 7/18
[52] U.S. Cl. .......................................... 348/68; 348/65
[58] Field of Search .................. 358/98, 42, 504, 518, 358/29; 348/65, 67, 68, 71, 76; H04N 7/18

[56] References Cited

U.S. PATENT DOCUMENTS

| | | | |
|---|---|---|---|
| 4,742,388 | 5/1988 | Cooper et al. | 358/98 |
| 4,974,094 | 11/1990 | Morito | 358/225 |
| 5,001,556 | 3/1991 | Nakamura et al. | 358/98 |
| 5,092,331 | 3/1992 | Nakamura et al. | 128/634 |
| 5,202,758 | 4/1993 | Tamburrino | 358/98 |

OTHER PUBLICATIONS

United States Statutory Invention Registration No. H881, published Jan. 1, 1991, "TV Seeker Electronic Color Filter," Harold H. Holt, inventor.

Primary Examiner—James J. Groody
Assistant Examiner—Cheryl Cohen
Attorney, Agent, or Firm—Beveridge, DeGrandi, Weilacher & Young

[57] ABSTRACT

The present invention is intended to enable the change of the operating mode of an observation apparatus of a video system between a fluorescent observation mode and an ordinary observation mode and to enable the observation apparatus to reproduce a clear image for observation. The observation apparatus in accordance with the present invention uses a principle that an image pickup system provides three color signals, namely, R-, G- and B-signals. The image pickup system of the observation apparatus is provided with an illuminating light selecting means for selectively using light in a specified wavelength region as illuminating light, and a color signal selecting means for selectively providing the color signals. When the specified wavelength region is the visible region, at least the color signals in a wavelength region including the specified wavelength region including the illuminating light are cut off. When the specified wavelength region is an ultraviolet region, the color signals in a wavelength region including the main wavelength region including fluorescent light emitted by excitation by the illuminating light in the ultraviolet region are provided selectively.

12 Claims, 3 Drawing Sheets

OBSERVATION APPARATUS FOR SELECTIVELY PROVIDING COLOR SIGNALS

BACKGROUND OF THE INVENTION

1. Field of the Invention

The present invention relates to an observation apparatus of a video system and, more particularly, to an observation apparatus suitable for fluorescent observation.

2. Description of the Prior Art

An observation apparatus of a video system reproduces the image of an object taken by an image pickup device on a reproducing monitor for observation. The image pickup device is provided with a small built-in video camera unit employing a solid state image pickup element, such as a CCD, and an illuminating system capable of illuminating the object with intense illuminating light. The observation apparatus enables the observation of a magnified image of the object illuminated with the illuminating light emitted by the illuminating system. Such a known observation apparatus is disclosed, for example, in Japanese Patent Publication No. 20615/92.

This known observation apparatus enables the observation of the object in various modes of observation by illuminating the object in various modes of illumination. A fluorescent observation mode is one of the various modes of observation. In a fluorescent observation mode, the object is illuminated with illuminating light selected among visible light in a specified wavelength region, such as a red light wavelength region, a green light wavelength region or a blue light wavelength region, and ultraviolet light, to relieve a fluorescent composite or a fluorescent structure that is excited specifically for luminescence by the illuminating light to emit fluorescent light for observation.

FIG. 3 shows an example of a known observation apparatus that enables fluorescent observation. This known observation apparatus is provided with an image pickup device 1 having an illuminating system which transmits light emitted by an external illuminating lamp 2 through an optical fiber bundle 3. The light emitting ends of time optical fibers 3f of the optical fiber bundle 3 are arranged in a circular arrangement, and the illuminating light emitted through the illuminating ends is condensed in an observation field by a semispherical condensing light guide 4.

The image pickup system of the observation apparatus comprises a camera unit 5 and an optical unit 6 for focusing the image of an object M on the image pickup device 5e of the camera unit 5. The illuminating system is provided with a first filter 7 for wavelength selection to pass light of a wavelength in a specified wavelength region, and the optical unit 6 is provided with a second filter 8 for region rejection to absorb the light passed through the first filter 7. The image taken by the image pickup device 1 is displayed on a monitor 9 for observation.

In this observation apparatus, the second filter 8 absorbs the illuminating light reflected by the object M and passes only fluorescent light emitted by a fluorescent composite or a fluorescent structure in the object made luminous by excitation with the illuminating light so that only the fluorescent light falls on the image pickup system for luminescent observation.

Accordingly, when using this known observation apparatus for fluorescent observation, the types of objects which can be observed are dependent on the combination of the first filter 7 and the second filter 8, and the filters 7 and 8 must be changed for other filters when observing another object or a fluorescent composite having another characteristics in the object.

Problems arises when changing the filters, particularly, the second filter. Since the second filter is disposed within the image pickup device having a small space available, it is difficult to design a mechanism for holding the second filter and it requires troublesome work to change the second filter for another filter.

Furthermore, the second filter must be capable of being set for both ordinary observation and fluorescent observation. Fluorescent observation is particularly useful when used in combination with ordinary observation. To enable the observation apparatus both ordinary observation and fluorescent observation, the second filter needs to be removed from the image pickup device or moved away from the path of the image light for luminescent observation. Both removing the second filter from the image pickup device and moving the second filter away from the path of the image light need mechanisms which are difficult to design.

When light in the ultraviolet region, i.e., ultraviolet radiation, is used as illuminating light for fluorescent observation, basically, the illuminating light reflected by the object need not be eliminated, and hence, there is no significant problem attributable to the second filter. However, if the illuminating light reflected by the object is not eliminated, the clearness of the fluorescent image is spoiled. As mentioned above, the image pickup device 1 of the observation apparatus of a video system can be held by hand and can be brought into contact with or near the object for observation. Although such a method of observation has a great advantage that the degree of freedom of observation is very large as compared with that of the conventional microscope employing a stationary stand for supporting the object, it is difficult to provide the image pickup device with a screening means for effectively screening the object from external light when ultraviolet radiation is used for fluorescent observation; consequently, the contrast of the image is reduced by undesired external light, i.e., disturbing light, to spoil the clearness of the fluorescent image.

SUMMARY OF THE INVENTION

Accordingly, it is an object of the present invention to provide an observation apparatus of a video system capable of easily achieving the fluorescent observation of different kinds of objects, of easily changing the observation mode between a fluorescent observation mode and an ordinary observation mode by simple operations and of forming a clear image for observation when ultraviolet radiation is used for illumination.

To achieve the object, the present invention provides an observation apparatus comprising: an image pickup system which provides a plurality of color signals of wavelengths in specified wavelength regions obtained by decomposing image light; an illuminating system for illuminating an object; and a reproducing system for reproducing the image of the object taken by the image pickup system; characterized in that the illuminating system is provided with an illuminating light selecting means for selecting light in a specified wavelength region to use the same as illuminating light, and the image pickup system is provided with a color signal selecting means for selectively providing each color signal.

The present invention uses the principle on which the image pickup system composes a color image by image signals for filtering. Since a color image pickup system, in general, represents the image of an object by R-, G- and B-signals respectively representing the images of three primary colors, i. e., R, G and B, of the image, one of the R-, G- and B-signals is provided or eliminated selectively to provide a filtering effect and to eliminate disturbing light.

More concretely, when the specified wavelength region is the visible region, the image pickup system functions in the following manner. If light in a region including B-light is selected as illuminating light, the image pickup system provides signals representing R-light and G-light and eliminates a signal representing B-light. Such a function of the image pickup system is equivalent to the function of a B-light absorbing filter. If light in a region including G-light is selected as illuminating light, the image pickup system provides signals representing R-light and B-light and eliminates a signal representing G-light. Such a function of the image pickup system is equivalent to the function of a G-light absorbing filter.

When the specified wavelength region is an ultraviolet region, the image pickup system provides a color signal representing a color in a wavelength region corresponding to the main wavelength region of fluorescent light emitted by the object excited by the illuminating light in the specified wavelength region. In this case, the principle on which the image pickup system composes a color image by image signals is used for eliminating disturbing light that reduces the clearness of the fluorescent image.

More concretely, when the main wavelength region of the fluorescent light emitted by the fluorescent composite or the fluorescent structure of the object is included in the wavelength region of G-light, the image pickup system eliminates color signals representing R-light and B-light and provides only a color signal representing G-light. When the main wavelength region of the same fluorescent light is included in the wavelength region of B-light, the image pickup system eliminates color signals representing R-light and G-light and provides only a color signal representing B-light.

The selection of a color signal representing R-light, G-light or B- light for filtering effect can be achieved electronically. Accordingly, the operating mode of the image pickup system can be very readily and quickly changed between fluorescent observation modes for observing different fluorescent objects and between an ordinary observation mode and a fluorescent observation mode by a simple mechanism. Furthermore, the possibility of changing the observation mode of the image pickup device without vibrating the image pickup device is particularly advantageous to an observation method that does not use any stand.

It is preferable for the simple, quick change of the operating mode of the image pickup system that the illuminating light selecting means and the color signal selecting means of the observation apparatus are interlocked so that the color signal selecting means operates according to the light selecting operation of the illuminating light selecting means.

As is apparent from the foregoing description, the term "specified wavelength region" means a wavelength region having a fixed range overlapping the wavelength region including the wavelength of a color signal provided by the image pickup system. Accordingly, the present invention does not intend to designate light of a fixed wavelength by the term "light in a specified wavelength region," but intends to designate light in a wavelength region having the center wavelength corresponding to a specified wavelength by "light in a specified wavelength region."

The above and other objects and features of the present invention will become more apparent when referred to the following description in conjunction with the accompanying drawings.

DESCRIPTION OF THE PREFERRED EMBODIMENTS

Figure 1:
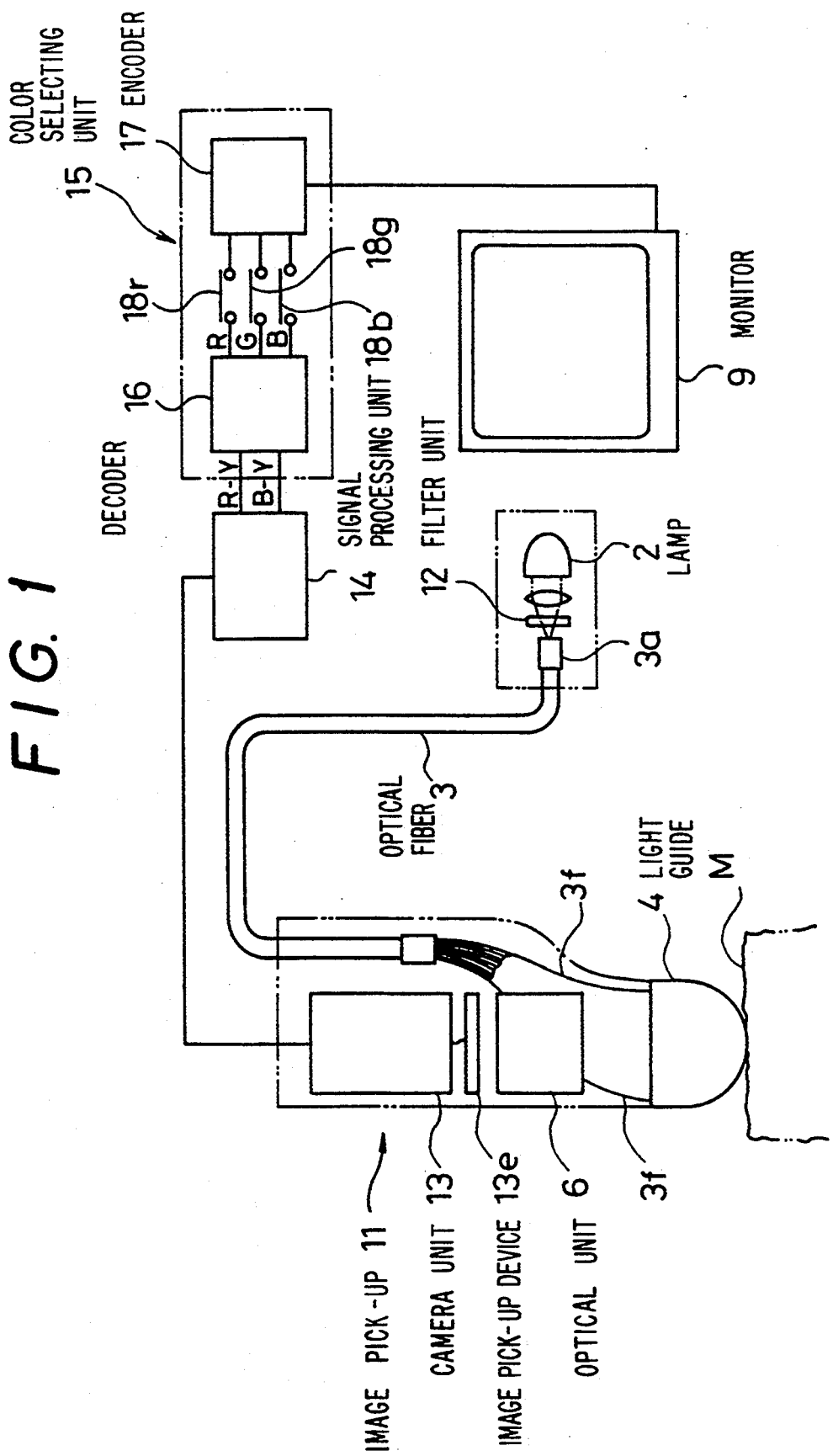
FIG. 1 is a block diagram of an observation apparatus in a preferred embodiment according to the present invention.

A preferred embodiment of the present invention will be described hereinafter, in which parts like or corresponding to those of the foregoing conventional observation apparatus are denoted by the same reference characters and the description thereof will be properly omitted.

An observation apparatus in this embodiment, similarly to the foregoing conventional observation apparatus, employs an external luminous source. As shown in FIG. 1, an illuminating lamp 2 and an image pickup device 11 are disposed separately. Illuminating light emitted by the lamp 2 is transmitted through an optical fiber bundle 3 and a light guide 4 to illuminate an object M.

Figure 2:
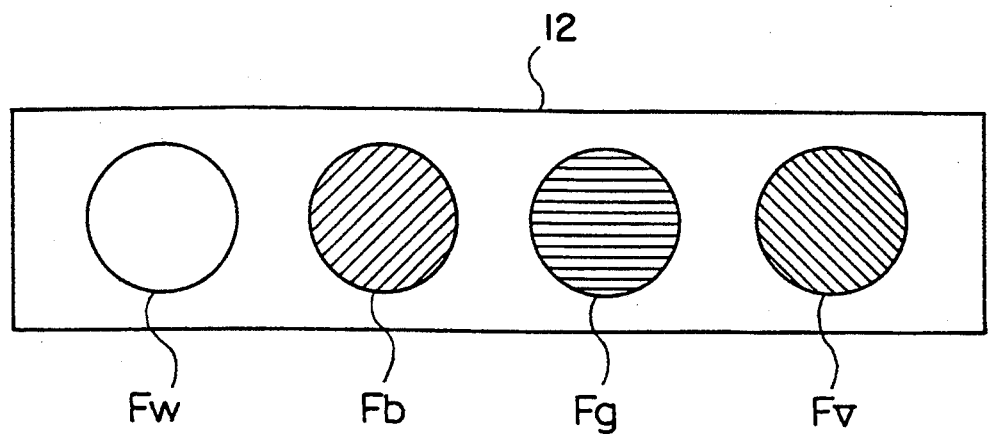
FIG. 2 is a view of a filter unit.
Figure 3:
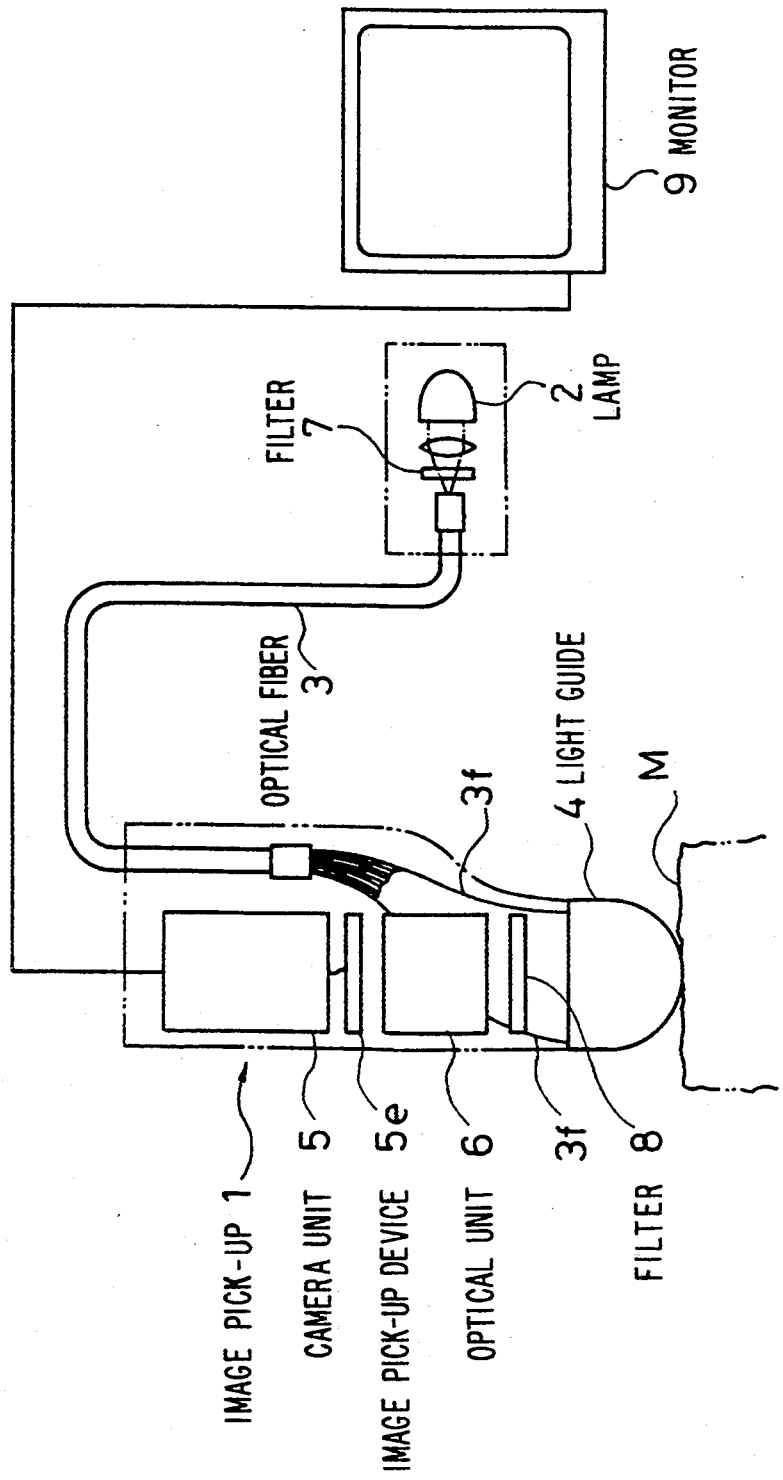
FIG. 3 is a block diagram of a conventional observation apparatus.

A filter unit 12 is interposed between the illuminating lamp 2 and the entrance end 3a of the optical fiber bundle 3. As shown in FIG. 2, a filter unit 12 has four filters, namely, a white filter Fw, a blue filter Fb, a green filter Fg and an ultraviolet filter Fv, in a lateral arrangement. The filter unit 12 is moved laterally to use the filters selectively. The illuminating lamp 2 is a lamp capable of emitting light in the ultraviolet region as well as light in the visible region, such as a metal halide lamp.

An external signal processing unit 14 processes the output signals of a camera unit 13 (including image pick-up device 13e) built in the image pickup device 11 to give an R-Y signal and a B-Y signal to a color signal selecting unit 15.

The color signal selecting unit 15 comprises a decoder 16 which converts the R-Y and B-Y signals into R-, G- and B-signals, and an encoder 17 for converting the output signals of the decoder 16 into signals conforming to the system of the reproducing monitor 9. The R-, G- and B-signals provided by the decoder 16 are transferred selectively to the encoder 17 through switches 18r, 18g and 18b interposed between the decoder 16 and the encoder 17.

The switches 18r, 18g and 18b are operated in connection with the operation of the filter unit 15; that is, the switches 18r and 18g for the R- and G-signals are closed and the switch 18b for the B-signal is opened when the blue filter Fb is set at the working position, the switch 18r for the R-signal is closed and the switches 18g and 18b for the G- and B-signals are opened when the green filter Fg is set at the working position, and all the switches 18r, 18g and 18b for the R-, G- and B-signals are closed when the white filter Fw is set at the working position for ordinary observation.

When the ultraviolet filter Fv is used, for example, for observing an object that emits fluorescent light in a wavelength region included in a wavelength region in which light represented by the G-signal is included, the switch 18g for the G-signal is closed and the switches 18r and 18b for the R- and B-signals are opened. When the ultraviolet filter Fv is used for observing an object that emits fluorescent light in a wavelength region included in a wavelength region in which light represented by the B-signal is included, the switch 18b for the B-signal is closed and the switches 18r and 18g for the R- and G-signals are opened.

Although the control of the condition of the switches 18r, 18g and 18b in connection with the operation of the filter unit 15 is preferable in respect of facility in operating the switches, if necessary, the switches 18r, 18g and 18b may be operated manually or by other suitable switch operating mechanism. When the reproducing monitor 9 is capable of receiving the R-, G- and B-signals, the encoder 17 is not necessarily needed. If the encoder 17 is omitted, the switches 18r, 18g and 18b are connected directly to the reproducing monitor 9.

Although the image pickup device 11 in this embodiment receives the illuminating light from the external illuminating light source, the present invention may employ an image pickup device provided with an internal illuminating light source, such as the image pickup device disclosed in Japanese Patent Laid-open No. 107410/92 or Japanese Patent Application No. 59676/91. The advantageous effect of the present invention on the simplification of the mechanism of an observation apparatus will be particularly effective on an image pickup device provided with an internal illuminating light source, which is subject to spatial restrictions.

As is apparent from the foregoing description, according to the present invention, the color separating function of a color image pickup system is used for the filtering function of an absorption filter for fluorescent observation and hence the filtering function can be changed electronically. Accordingly, the operating mode can be easily changed between fluorescent observation modes for observing different fluorescent objects and between an ordinary observation mode and a fluorescent observation mode by a simple mechanism.

What is claimed is:

1. An observation apparatus comprising: an image pickup system for providing a plurality of color signals representing a plurality of light colors in a first specified wavelength region; an illuminating system for illuminating an object with illuminating light; and a reproducing system for reproducing an image of the object taken by the image pickup system;

said illuminating system including an illuminating light selecting means for selecting illuminating light in a second specified wavelength region for illumination, and said image pickup system including a color signal selecting means for selectively providing the color signals to the reproducing system such that the illuminating light is not provided to the reproducing system.

2. An observation apparatus according to claim 1, wherein when the second specified wavelength region is in an ultraviolet region, color signals in a wavelength region including a main wavelength region in which fluorescent light is emitted by excitation by the illuminating light are provided selectively to the reproducing system.

3. An observation apparatus according to claim 1, wherein said color signal selecting means is operated according to the light selecting operation of said illuminating light selecting means for selecting light in the first specified wavelength region.

4. An observation apparatus according to claim 2, wherein said color signal selecting means is operated according to the light selecting operation of said illuminating light selecting means for selecting light in the first specified wavelength region.

5. An observation apparatus according to claim 1, wherein said illuminating light selecting means is a filter unit which includes a plurality of filters in a lateral arrangement.

6. An observation apparatus comprising: an image pickup system for providing a plurality of color signals representing a plurality of light colors in a first specified wavelength region; an illuminating system for illuminating an object with illuminating light; and a reproducing system for reproducing an image of the object taken by the image pickup system;

said illuminating system including an illuminating light selecting means for selecting illuminating light in a second specified wavelength region for illumination, and said image pickup system including a color signal selecting means for selectively providing the color signals to the reproducing system such that light other than fluorescent light emitted by the object is not provided to the reproducing system.

7. An observation apparatus according to claim 6, wherein the second specified wavelength region is in a visible region.

8. An observation apparatus according to claim 6, wherein the second specified wavelength region is in an ultraviolet region.

9. An observation apparatus according to claim 6, wherein said color signal selecting means is operated according to the light selecting operation of said illuminating light selecting means for selecting light in the first specified wavelength region.

10. An observation apparatus according to claim 7, wherein said color signal selecting means is operated according to the light selecting operation of said illuminating light selecting means for selecting light in the first specified wavelength region.

11. An observation apparatus according to claim 8, wherein said color signal selecting means is operated according to the light selecting operation of said illuminating light selecting means for selecting light in the first specified wavelength region.

12. An observation apparatus according to claim 6, wherein said illuminating light selecting means is a filter unit which includes a plurality of filters in a lateral arrangement.

* * * * *